March 11, 1969

H. T. HASHEMI ET AL 3,431,747

ENGINE FOR EXCHANGING ENERGY BETWEEN HIGH AND LOW PRESSURE SYSTEMS

Filed Dec. 1, 1966

INVENTORS
HADI T. HASHEMI &
JERRY L. LOTT
BY
Dunlap and Laney
ATTORNEYS

INVENTORS
HADI T. HASHEMI &
JERRY L. LOTT
BY Dunlap and Laney
ATTORNEYS

INVENTORS
HADI T. HASHEMI &
JERRY L. LOTT
BY
Dunlap and Laney
ATTORNEYS

United States Patent Office 3,431,747
Patented Mar. 11, 1969

3,431,747
ENGINE FOR EXCHANGING ENERGY BETWEEN HIGH AND LOW PRESSURE SYSTEMS
Hadi T. Hashemi, P.O. Box 2594, and Jerry L. Lott 725 Schulze St., both of Norman, Okla. 73069
Filed Dec. 1, 1966, Ser. No. 598,423
U.S. Cl. 62—123      14 Claims
Int. Cl. F04b *1/22;* C02b *1/12;* F15b *3/00*

ABSTRACT OF THE DISCLOSURE

An engine for efficiently transferring energy from a fluid at a relatively high pressure to a fluid at a relatively low pressure, particularly where such fluids are solid-liquid slurries such as those used in freeze crystallization systems. The engine includes a movable member which has one or more bores therethrough, and which moves relatively to an adjacent stationary member having at least one pair of fluid inlet passageways and one pair of fluid discharge passageways therethrough opening in one or more surfaces of the stationary member which are in juxtaposition to one or more surfaces of the movable member. The openings to each of the bores through the movable member and the openings of the passageways through the stationary member are positioned in their respective surfaces so that during movement of the movable member by a suitable driving shaft, the openings at the ends of each of the bores are, in alternating sequence, brought, at one time, into concurrent registry with an inlet passageway opening at one end of the respective bore and a discharge passageway opening at the other end of the respective bore, and then, at a different time, are brought into concurrent registry with a discharge passageway opening and an inlet passageway opening at the reversed or opposite ends of each bore. A free moving piston is freely movable in each bore under the impress of fluid pressure and divides each bore into two chambers.

---

This invention relates to apparatus for exchanging pressure energy between a fluid having a high energy content as a result of pressurization and a relatively lower pressure fluid. More specifically, but not by way of limitation, the present invention relates to a system for efficiently transferring the pressure energy contained in a pressurized liquid or pumpable slurry.

Many industrial processes require the pressurization or depressurization of fluids or mixtures of fluids with solids. In such instances, pressurization is usually achieved by utilizing a mechanical or electrical device, or using steam or combustion gases as a motive fluid. Depressurization is usually achieved by expansion through a valve, in which case no useful energy is recovered, or by expansion through a turbine. In the case of the turbine depressurization, however, the turbine is usually employed to accommodate the expansion of a gas, since there is little useful energy in an expanding liquid.

In processes where a liquid is made to flow under pressure, only a relatively small portion (about 20%) of the total energy input is consumed in pressurizing the liquid, the bulk of the energy being used instead to maintain the fluid in flow under pressure. For this reason, continuous flow operation requires much greater energy consumption than non-flow pressurization, such as driving a free piston into a rigid container.

In some industrial processes, elevated pressures are required only in certain parts of the operation to achieve desired results, following which the pressurized fluid is depressurized. In other processes, some fluids used in the process are available at high pressures and others at low pressures, and it is desirable to exchange pressure energy between these two fluids. In some applications, as will become apparent hereinafter, great improvement in economy can be effected if pressure energy can be efficiently transferred between two liquids or between pumpable slurries of liquid-solid mixtures.

Illustrative of a specific process of the type described is the exchange crystallization process for effecting desalination of sea water, or other saline aqueous solutions. In this process a slurry of ice and an exchange liquid, such as a hydrocarbon, is placed under superatmospheric pressure in order to reverse the order of freezing so that the ice crystals melt, and the exchange liquid is partially frozen. Following this step of the desalination process, the water derived from melting of the ice is separated from the hydrocarbon, which is in the form of a slurry of solid hydrocarbon particles with the liquid hydrocarbon, and the separated phases are then depressurized to near atmospheric pressure. The economy with which the exchange crystallization desalination process can be practiced is directly dependent upon the efficiency with which the energy input to the process upon pressurization of the ice-exchange liquid system can be recovered after separation of the water-exchange liquid phases.

As another example of a process in which the economies of the process are importantly affected by the efficiency with which the pressure energy can be recovered may be cited the reverse osmosis process of removing salt from saline aqueous solutions. Here the saline aqueous solution is pumped to a pressure of from about 100 atmospheres to about 150 atmospheres where fresh water is separated from reject brine and the reject brine is then depressurized to near atmospheric pressure.

Proposals have recently been advanced by C. Y. Cheng and co-workers at Kansas State University to recover a substantial portion of the energy of a pressurized fluid system developed in desalination of sea water by utilizing a so-called flow work exchanger for the purpose of simultaneously depressurizing a first condensed fluid and pressurizing a second condensed fluid. The Cheng flow work exchanger is generally based on a floating or free piston concept in which a free piston mounted in a stationary cylinder reciprocates in the cylinder upon input to the cylinder in alternate fashion of high pressure and low pressure fluids from two isolated systems. The Cheng free piston flow work exchanger requires the inclusion of rapidly operating valving in the ports or conduits connected to the cylinder in which the free piston reciprocates, and due to the requirement for the inclusion of such valving, experiences some energy loss as a result of flow of fluids through the valving into the stationary cylinder. Moreover, to handle large volumes of liquids, the practical limitation of rapid operation of the valves necessitates the use of large numbers of such flow work exchangers. Finally, the system is susceptible to plugging when pumping slurries of the type used in Cheng's process (which involves inversion of the order of melting points) as such slurries are pumped through the valves positioned in the inlet lines or conduits leading to the stationary cylinder.

The present invention provides a device which can be appropriately described as an engine for exchanging pressure energy between relatively high and relatively low pressure fluid systems, with the term fluid being defined here as including gases, liquids, and pumpable mixtures of liquids and solids. The engine for pressure energy exchange of the present invention is a highly efficient device by which well over 90% of the energy of pressurization in a pressurized fluid system can be transferred to a fluid system at a lower pressure, and the device employed for achieving the highly efficient energy transfer is characterized in having a long and trouble-free operating life which is not interrupted by the plugging or fouling of valves, or the binding or freezing of sliding pistons or the like.

Broadly described, the engine of the present invention comprises a movable member which moves against, or in contact with, a stationary structure. The movable member has at least one bore formed therein, and each of these bores has an opening at each of its ends with each opening located in a surface of the movable member, and all of the bore openings spaced from each other. A freely mobile separatory member is positioned in each of the bores and is movable along the bore and dimensioned to divide the bore into a pair of chambers as the separatory member moves along the bore.

The stationary structure which is in contact with the movable member has at least one sealing surface which slidingly and sealingly engages every surface of the movable member in which one or more of the openings to the bores in the movable member are located. The stationary structure further has at least one pair of spaced, two-ended fluid inlet passageways extending into it and opening at each end at one or more of the sealing surfaces, and at least one pair of spaced, two-ended fluid discharge passageways spaced from the fluid inlet passageways, and also opening at one or more of the sealing surfaces of the stationary structure. The openings to the bore or bores in the movable member, and the opening to the passageways in the stationary structure are positioned in their respective surfaces so that during movement of the movable member, the openings at the end of each of the bores in the movable member are, in alternating sequence, brought, at one time, into concurrent registry with an inlet passageway opening at one end of the respective bore and a discharge passageway opening at the other end of the respective bore, and then, at a different time, are brought into concurrent registry with a discharge passageway at said one end of the respective bore and an inlet passageway at said other end of the respective bore. In other words, as the movable member is moved with its surfaces in which the bore openings are located in sealing contact with the sealing surface or surfaces of the stationary structure, the openings into the two ends of each bore are periodically brought into communication with a fluid inlet passageway at one end of the bore and a fluid discharge passageway at the other end of the bore, and alternately, the position of the fluid inlet and fluid discharge passageways with respect to the ends of the bore is periodically reversed. Finally, in the broad characterization of the engine of the invention, means is included in the system for cyclically moving the movable member relative to the stationary member so that each of the bore openings periodically moves through the same path to repeatedly effect the described sequence of registration between the bore openings and the openings of the inlet and discharge passageways which are provided in the stationary member.

The engine as thus broadly described is used in combination with a source of relatively high pressure fluid which is connected to those fluid inlet passageways which have their openings periodically in registry with the openings at one end of each of the respective bores, and in combination with a source of fluid under lower pressure than said relatively high pressure fluid, which source of fluid under lower pressure is connected to those fluid inlet passageways in the stationary structure which are periodically in registry with the opening at the other end of each of the respective bores. A fluid confining means is connected to the fluid discharge passageways which are in communication through their respective openings with each of the respective bores at such times as the opening at said one end of each of the respective bores is in registry with the fluid inlet passageways connected to the source of relatively high pressure fluid.

In a preferred embodiment of the invention, the movable member which is utilized comprises a solid cylindrical rotor having a pair of opposed, planar, substantially parallel end faces, and having at least one axially extending bore therethrough which opens at the opposite end faces of the solid cylindrical rotor. The rotor is rotatably mounted for rotation about its longitudinal axis. A spherical separatory member is rollably positioned in each bore of the rotor and is dimensioned to sealingly partition the bore into a pair of chambers on opposite sides of the spherical member.

The stationary structure which is used in conjunction with the rotatably mounted solid cylindrical rotor includes a pair of end plates which each carry a fluid inlet passageway and a fluid discharge passageway, the two end plates therefore containing collectively at least one pair of inlet passageways and at least one pair of discharge passageways. A motor having a suitable shaft drivingly connected to the solid cylindrical rotor is used for driving the cylindrical rotor in rotation. The orientation of the bores through the solid cylindrical rotor and the fluid inlet and fluid discharge passageways through the end plates is such that as the solid cylindrical rotor rotates, each bore is consecutively brought into alignment or registry with one of the fluid passageways in one of the end plates, and simultaneously, with one of the fluid passageways in the other end plate.

In the operation of the described preferred embodiment, the fluid passageways which are alternately encountered by the ends of the bores through the rotatably mounted solid cylindrical rotor, and which are located in the same end plate, are alternately connected to a source of a relatively high pressure fluid, and to venting means for venting fluid to atmospheric, or near atmospheric, pressure. The fluid passageways in the opposite end plate are alternately connected to a source of fluid at a substantially lower pressure than the high pressure fluid, and to a vessel or container for confining fluid which is to be elevated in pressure as a result of action thereon by the energy exchange engine. When the motor is energized to drive the rotor in rotation, and the described connections are made to the fluid passageways in the end plates, substantially all of the pressure energy of a pressurized fluid can be transferred to a fluid at a relatively lower pressure so as to build up the pressure in the latter fluid to a level which is at least 90 percent of the original pressure of the high pressure fluid.

From the foregoing description of the invention, it will have become apparent that it is an important object of the invention to provide a device which will permit an efficient transfer of energy from a high pressure fluid to a fluid at a lower pressure.

Another, more specific object of the invention is to provide a method for efficiently transferring the energy of pressurization from a pressurized slurry to a second slurry at a lower pressure.

Another object of the invention is to provide a pressure energy exchanging engine for transferring pressure between isolated fluid systems without the use of conventional in line valving.

An additional object of the invention is to provide a pressure energy exchanging engine which can be relatively economically manufactured, and which has a long and trouble free operating life.

In addition to the described objects and advantanges of the invention, additional objects and advantages will become apparent as the following detailed description of the invention is read in conjunction with the accompanying drawings.

In the drawings:

FIGURE 8 is a schematic flow diagram illustrating the manner in which pressure energy exchange engines of the present invention can be used to advantage in an exchange crystallization process for purifying water by removing salt therefrom.

Figure 1:
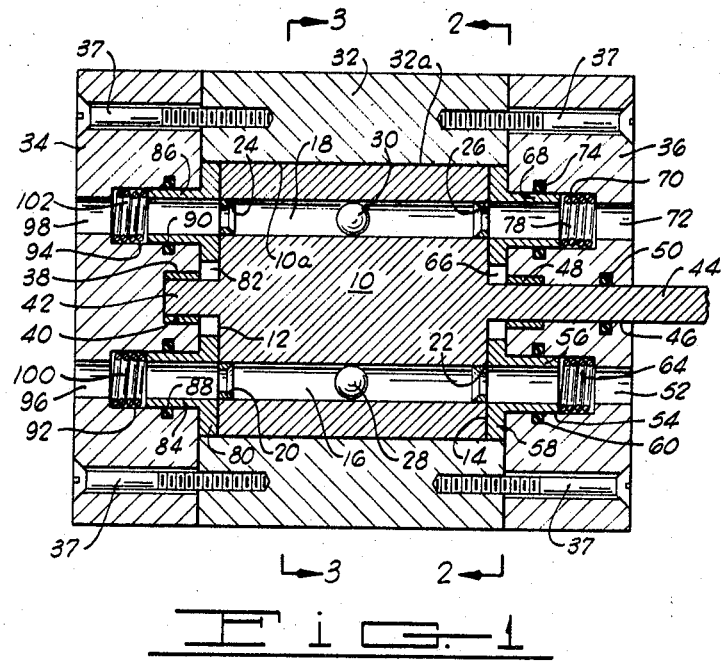
FIGURE 1 is a longitudinal sectional view through a pressure energy exchange engine constructed in accordance with the present invention.

Referring to the drawings, and particularly to FIGURE 1, the pressure exchange engine of the present invention comprises, in the illustrated embodiment, a solid cylindrical rotor 10 which has a pair of spaced, substantially planar, substantially parallel end faces 12 and 14. Extending through the rotor 10 in an axial direction are a plurality of spaced bores of generally circular cross-section. Two of the axially extending bores are employed in the embodiment of the invention depicted in FIGURE 1, and are designated by reference numerals 16 and 18. It should be pointed out, however, that the rotor 10 may contain as many of the bores as desired, or may contain only one such bore. It will be noted that the bores 16 and 18 each open at their opposite ends in the two end faces 12 and 14.

Pressed into the two ends of each of the bores 16 and 18 are ball stops. The ball stops at the opposite ends of the elongated, axially extending bore 16 are designated by reference numerals 20 and 22, and those at opposite ends of the elongated, axially extending bore 18 are designated by reference numerals 24 and 26. A small spherical member or ball 28 is rollably mounted in the axial bore 16, and a spherical member or ball 30 is rollably mounted in the bore 18. The balls 28 and 30 may be constructed of any hard, rigid material, but for reasons which will hereinafter become apparent, these balls are preferably constructed of a relatively low density material, such as a hard and wear-resistant synthetic resin, rather than a relatively high density material, such as steel.

Surrounding and enclosing the cylindrical rotor 10 in a circumferential manner is a cylindrical housing 32. The cylindrical housing 32 has a radially inner cylindrical wall 32a which is preferably positioned closely adjacent but out of contact with the outer peripheral wall 10a of the rotor 10. It will be noted in referring to FIGURE 1 that the cylindrical housing 32 is of greater axial length than the rotor 10 so that it projects a short distance beyond the end faces 12 and 14 of the rotor. A pair of generally cylindrical, relatively thick closure plates 34 and 36 are secured by axially extending bolts 37 to the cylindrical housing 32.

The closure plate 34 is provided with a central recess 38 in which is mounted an annular bearing 40 for journaling a central stub axle 42 projecting from the end face 12 of the rotor 10. Directly opposite the stub axle 42 on the other end of the rotor 10 and projecting from the end face 14 thereof is a drive shaft 44 which extends through a bore 46 in the closure plate 36 and is adapted to be connected at its outer end to a suitable source of power, such as an electric motor or the like (not illustrated). The drive shaft 44 is journaled in a suitable bearing 48 and is sealed against fluid leakage by an O-ring 50.

Figure 2:
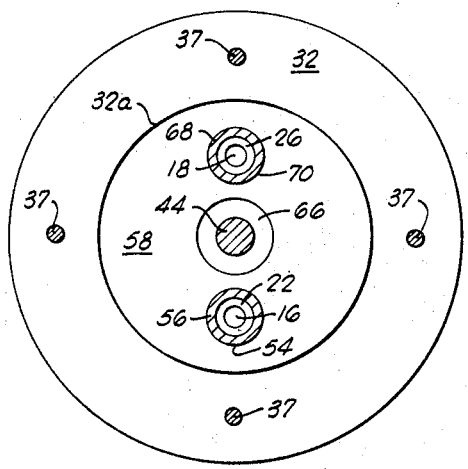
FIGURE 2 is a sectional view taken along line 2—2 of FIGURE 1.
Figure 3:
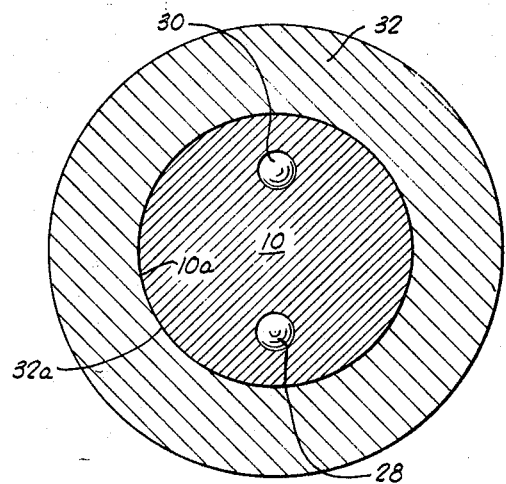
FIGURE 3 is a sectional view taken along line 3—3 of FIGURE 1.
Figure 3:
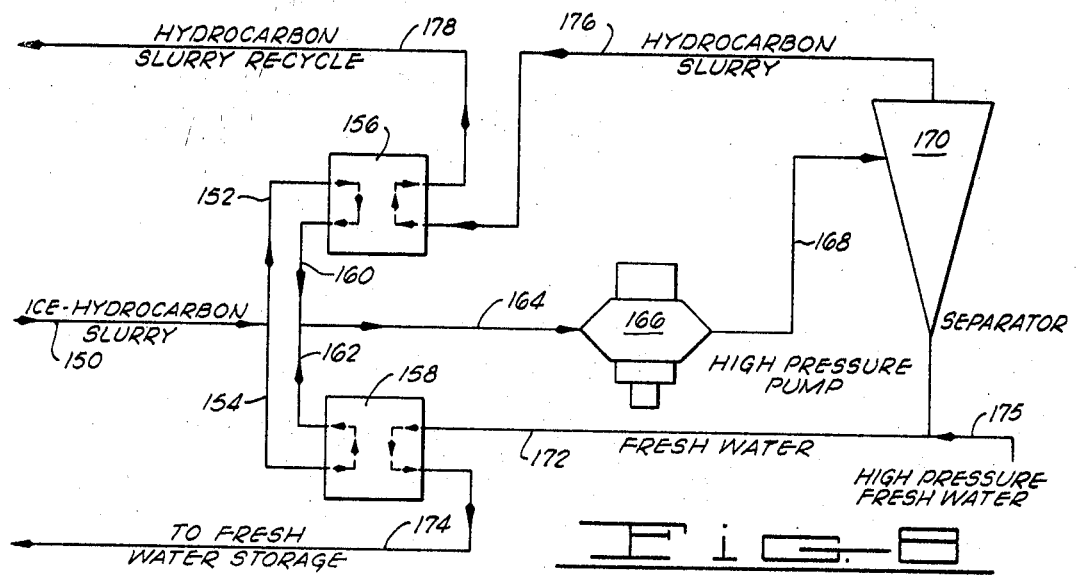

An elongated low pressure fluid inlet passageway 52 extends through the closure plate 36 in a direction substantially parallel with the bore 46, and includes a counterbore 54 which is dimensioned to receive a tubular projection 56 from a circular seal plate 58. The tubular projection 56 is surrounded and sealingly engaged by an O- ring seal 60 which is positioned in a suitable dimensioned groove coaxially surrounding the counterbore 54. A helically shaped spring 64 is positioned in the counterbore 54 between the base of the counterbore and the end of the tubular projection 56. The spring thus biases the circular seal plate 58, which has opposed flat faces, toward the planar end face 14 of the rotor 10 for a purpose hereinafter described. It will be noted in referring to FIGURE 2 of the drawings that the seal plate 58 is circular in configuration and is provided with a relatively large central aperture 66 which passes the drive shaft 44. One of the planar or flat faces of the seal plate 58 bears flatly against the end face 14 of the rotor 10 and establishes a seal with the rotor. Either the seal plate 58 will be constructed of a material having a very low coefficient of friction when in contact with the rotor, or more preferably, a suitable lubricant material will be interposed between the rotor 10 and the seal plate 58. As will be hereinafter explained, ice or a liquid or slurry being pumped by the pressure energy exchange liquid constitute preferred lubricant materials.

The seal plate 58 further includes, in addition to the tubular projection 56, a second tubular projection 68, which, in the illustrated embodiment of the invention, is disposed 180° from the tubular projection 56 around the generally circular seal plate 58, and extends into a counterbore 70 of a high pressure fluid discharge passageway 72. An O-ring seal 74 is mounted in a suitably dimensioned annular groove and sealingly surrounds the tubular projection 68 of the seal plate 58 when it is positioned as shown in FIGURE 1. A helical spring 78 continuously biases the tubular projection 68 and the seal plate 58 toward the end face 14 of the rotor 10.

Engaging the end face 12 of the rotor 10 at the opposite end thereof from the end face 14 is a seal plate 80 which is constructed substantially identically to the seal plate 58. Thus, the seal plate 80 has a central aperture 82 formed therein which is dimensioned to freely pass the stub axle 42 of the rotor 10. The seal plate 80 also has a substantially monoplanar or flat face which bears against the end face 12 of the rotor 10 or, more preferably, against a thin film of lubricant material which is interposed between the face of the seal plate and the end face 12 of the rotor. The seal plate 80, like the seal plate 58, carries a pair of tubular projections 84 and 86, with such projections being encircled by O-ring seals 88 and 90, and extending into enlarged counterbores 92 and 94. The counterbores 92 and 94 form portions of a low pressure fluid discharge passageway 96 and a high pressure fluid inlet passageway 98, respectively. Helical springs 100 and 102 are provided in the counterbores 92 and 94, respectively, for biasing the seal plate 80 into sealing engagement with the end face 12 of the rotor 10.

It will be noted that the open ports or passageways through the tubular projections 56 and 68 (in the case of the seal plate 58), and the open ports or passageways through the tubular projections 84 and 86 (in the case of the seal plate 80) are located in the respective seal plates so as to be in alignment with the axially extending bores 16 and 18 through the rotor 10 when the rotor is in the position depicted in FIGURE 1. Of course, as the rotor 10 is driven in rotation by power applied to the drive shaft 44, the axial bores 16 and 18 are moved out of alignment with the respective tuublar projections of the seal plates 58 and 80. The openings to each end of each of the axially extending bores 16 and 18 are disposed on the same imaginary circular paths as are the openings through the seal plates 58 and 80 into the passageways through the respective tubular projections. Thus, the high pressure and low pressure fluid inlet and fluid discharge passageways which are provided through the seal plates 58 and 80 and also the closure plates 34 and 36 are consecutively brought into registration with the axially extending bores 16 and 18 through the rotor 10 at such time as the rotor is driven in rotation. It should be pointed out that although pairs of the tubular projections 56, 68 and 84, 86 have been indicated to project axially from each of the seal plates 58 and 80 used in the embodiment of the invention shown in FIGURE 1, the invention is operative when any number of pairs of the tubular projections, and their corresponding aligned fluid inlet and fluid discharge passageways through the closure plates 34 and 36 are employed. For clarity of description, however, a relatively simple pressure exchange engine has been depicted in FIGURE 1, and its operation will be hereinafter described.

*Operation*

Before referring to specific tests which have been conducted, and data which has been accumulated from the use of the present invention, it is believed that such data will be more meaningful, and the use of the invention be better understood if FIGURE 1 is next employed for the purpose of describing, by reference to it, the manner in which the apparatus there depicted operates in the practice of the present invention. Let it be assumed at the outset that two process liquids which shall be called liquid A and liquid B are available in an industrial process at pressures $P_2$ and $P_1$, respectively. Let it be assumed that the pressure $P_1$ of liquid B is substantially greater than the pressure $P_2$ of liquid A. It is not material what two liquids are employed and, in fact, both of the liquids may be a slurry. Gases may also be employed, although the preferred and most advantageous use of the present invention occurs when liquids or pumpable slurries are utilized.

With a source of liquid A at pressure $P_2$ available, this source is connected to the low pressure fluid inlet passageway 52 in the closure plate 36 so that liquid A at pressure $P_2$ may enter this passageway and the tubular projection 56. The passageway 96 through the closure plate 34 is connected to a relatively low pressure zone, in most instances, an atmospheric pressure zone. The high pressure inlet passageway 98 is connected by a pipe, conduit or other suitable means to a source of the high pressure liquid B which is maintained at pressure $P_1$. Finally, the high pressure discharge passageway 72 is connected to suitable fluid confining means which can retain a fluid under pressure, and can permit fluid under pressure to be pumped thereinto from the high pressure fluid discharge passageway 72.

With these connections made to the several fluid passageways through the closure plates 34 and 36 of seal plates 58 and 80, the depicted structure can be utilized for efficiently transferring substantially all of the pressure energy from the high pressure liquid B to the relatively lower pressure liquid A. Having set the rotor 10 in rotational motion by energizing a motor or other suitable prime mover connected to the drive shaft 44, the axial bores 16 and 18 formed in the rotor 10 are, in consecutive sequence, brought into axial alignment with the bores or ports through the tubular projections 56 and 84, and then 68 and 86 formed in the two seal plates 58 and 80. Thus, at the instant in the operation of the device which is represented by the positions of the elements shown in FIGURE 1, the rotor has been rotated to a position in which the axially extending bore 16 is aligned with the openings through the tubular projections 56 and 84. Concurrently, the bore 18 has been aligned with the openings through the tubular projections 68 and 86. At this time, the relatively low pressure liquid A at pressure $P_2$ enters the bore 16 to right of the ball 28 via the low pressure fluid inlet passageway 52, and the communicating passageway through the tubular projection 56. At the same time, some of liquid B which has been previously entrapped in the part of the bore 16 to the left of the ball 28 is placed in communication with a vent or low pressure environment and can be discharged through the tubular projection 84 and the communicating discharge passageway 96 as the ball 28 is displaced to the left in the bore 16 by the impress of the relatively low pressure fluid A entering the right side of this bore.

In the case of the axially extending bore 18, at the instant depicted in FIGURE 1, relatively high pressure liquid B at pressure $P_1$ is entering the left side of this bore from the high pressure fluid inlet passageway 98, and drives the ball 30 toward the right. This displaces the entrapped liquid A which is disposed in the right side of the bore 18 as a result of its entry into this bore at a previous time when the bore 18 occupied the position shown as occupied by the bore 16 in FIGURE 1. This occurred, of course, at a time earlier in the rotational movement of the rotor 10. Continued impress of the high pressure liquid B upon the left side of the ball 30 eventually drives the ball 30 to the right side of the bore 18, and completely displaces the relatively lower pressure fluid A from this bore at a pressure which is only slightly less than that of the high pressure fluid B.

It may thus be seen that as the rotor 10 continues to rotate, the net effect is that, in being depressured from its elevated pressure $P_1$ to atmospheric pressure, the high pressure liquid B is made to transfer effectively its energy of pressurization to the relatively lower pressure liquid A. The transfer is highly efficient due to the minimum energy requirement to displace the balls 28 and 30 in their respective bores, and no valving is included in the system which can become choked or clogged by any entrained material carried in the liquids between which the energy transfer is to take place. Thus, relatively thick slurries of high solids content can be successfully passed through the pressure exchange engine without damage to it, despite its use over extended periods of time for transferring pressure energy between such slurries.

From the described operation of the pressure exchange engine, it will be apparent that various differently formed structures can be employed other than the particular embodiment depicted in FIGURE 1. Thus, the rotor 10 may include a great many circumferentially spaced, axially extending bores rather than merely two as depicted. Also, the number of tubular projections and fluid passageways which are formed through the seal plates and the closure plates used in the device may include a much larger number than the four which are shown in FIGURE 1. It will be apparent, of course, from what has been said that at least one pair of fluid inlet and fluid discharge passageways should be provided regardless of the number of bores in the rotor 10. It should also be pointed out here that, though a solid cylindrical rotor 10 has been depicted as used in a preferred embodiment of the invention, the geometric shape and the type of movement undergone by a movable element corresponding in its function to the rotor 10 can be varied greatly, and it is only required that the bore or bores which are provided in such movable element shall sequentially line up, or be placed in registry, with the passageways through the stationary structure which is used in conjunction with the movable member.

Figure 4:
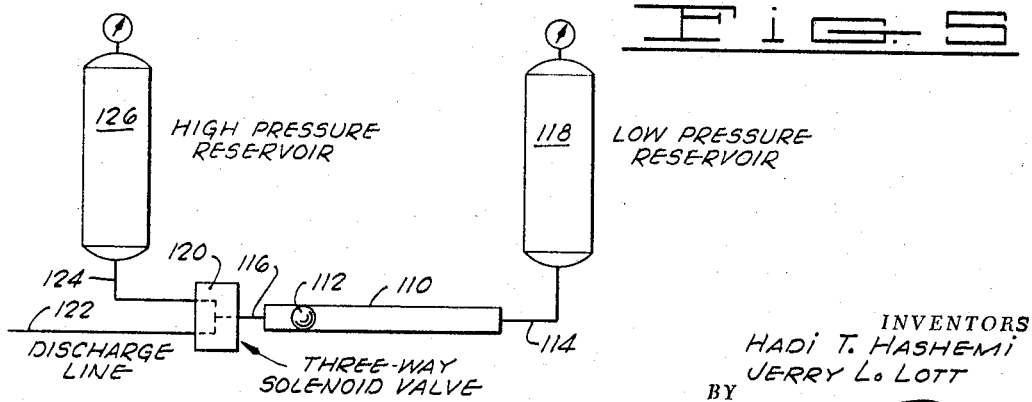
FIGURE 4 is a schematic diagram illustrating a testing apparatus used for evaluating certain aspects of the present invention.

Preliminary tests were conducted to evaluate various aspects of the pressure exchange engine of the invention. A structure developed for testing the effect of suddenly reversed fluid pressure on the movement of a spherical member in an elongated circularly cross-sectioned bore is depicted in FIGURE 4 of the drawings. Here, an elongated plastic tube 110 was provided and had an inside diameter of ⅝ inch and a length of 10 inches. A steel ball 112 having a diameter departing from ⅝ inch by only a sufficient amount to permit it to roll in the tube was positioned in the tube. The opposite ends of the tube 110 weer connected by suitable conduits 114 and 116 to a low pressure fluid reservoir 118 and a manually operated three-way solenoid valve 120, respectively. The three-way solenoid valve was connected to a discharge line 122 discharging to atmospheric pressure and to a conduit 124 leading to a high pressure reservoir 126. Water under a high pressure was stored in the high pressure reservoir 126, and water under a relatively low pressure was stored in the low pressure reservoir 118. The solenoid valve 120 was employed for introducing water under a high pressure to one end of the plastic tube 110, and for alternately receiving water under a low pressure from that same end of the plastic tube and venting it to atmospheric pressure. At the latter time, of course, the introduction of high pressure water from the high pressure reservoir 126 to the tube 110 was prevented.

Figure 5:
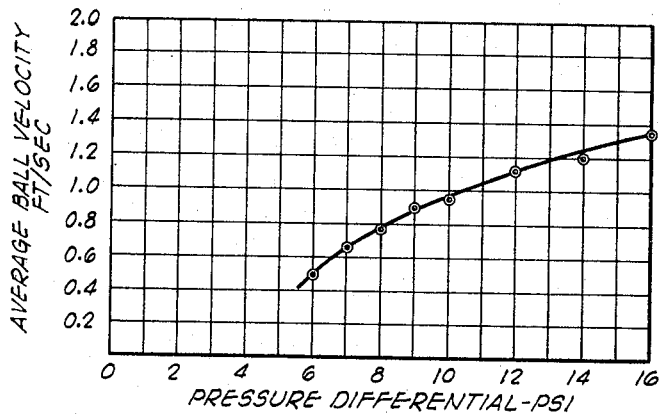
FIGURE 5 is a graph illustrating the results obtained using the testing apparatus shown in FIGURE 4.

In feasibility tests, pressure differentials between the high and low pressure reservoirs of from about 6 p.s.i. to about 16 p.s.i. were investigated. The average velocity of the ball 112 per cycle for the various pressure differentials applied is shown in FIGURE 5. It was found that for pressure differentials across the ball 112 of less than 6 p.s.i., the existing frictional opposition offered by the steel ball to movement in the tube prevented easy and smooth movement of the ball. On the other hand, for pressure differentials across the ball 112 exceeding about 16 p.s.i., the speed of the ball in the tube 110 became too fast to permit reversal of the direction of movement of the ball to be accurately controlled by manually manipulating the three-way solenoid valve.

Figure 6:
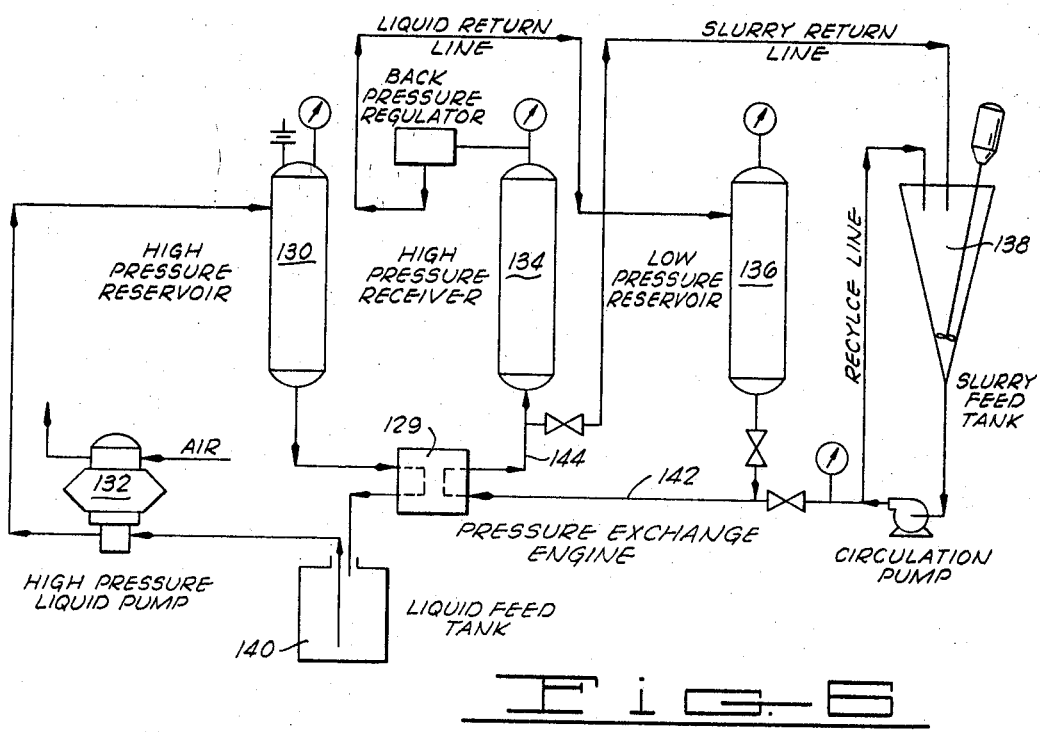
FIGURE 6 is a schematic flow diagram illustrating the manner in which the pressure energy exchange engine of the invention can be utilized in a process for transferring pressure from a high pressure fluid to a fluid of relatively lower pressure.

A pressure energy exchange engine constructed in accordance with the present invention had a rotor having a diameter of 1¾ inches and a length of 1¼ inches. Four cylindrical bores were formed through the rotor and spaced circumferentially from each other on a circle. The cylindrical bores were ¼ inch in diameter and extended the length of the rotor. Teflon balls with diameters of 0.245 inch were used in the bores. A housing was provided around the rotor. Two high pressure fluid inlet ports and two high pressure fluid discharge ports (to atmospheric pressure), as well as two low pressure inlet ports and two low pressure fluid discharge ports were extended through the housing to the opposed internal surfaces of the housing which abutted the end faces of the rotor. A pressure exchange engine 129 constructed in this manner was evaluated by connection in a system which included a high pressure reservoir 130, high pressure pump 132, high pressure receiver 134, low pressure reservoir 136, and slurry feed system 138, all as depicted in FIGURE 6 of the drawings. Water was initially used as the test liquid. The water in the low pressure reservoir 136 was colored a red color to differentiate it from the clear water used in the high pressure side of the system. A pressure differential across the Teflon balls of 4 p.s.i. was used in the system which employed water, and also in later tests using liquid hydrocarbons.

Water from the high pressure reservoir 130 at 30 p.s.i.g. was introduced to the high pressure fluid inlet ports, and red colored water at 4 p.s.i.g. was transferred from the low pressure reservoir to the low pressure fluid inlet ports via conduit 142. The red colored water was discharged from the pressure energy exchange engine 129 through a conduit 144 to the high pressure receiver 134. The depressurized clear water from the engine 129, after being discharged into the open feed tank 140, was recirculated by the high pressure pump 132 to the high pressure reservoir 130.

Figure 7:
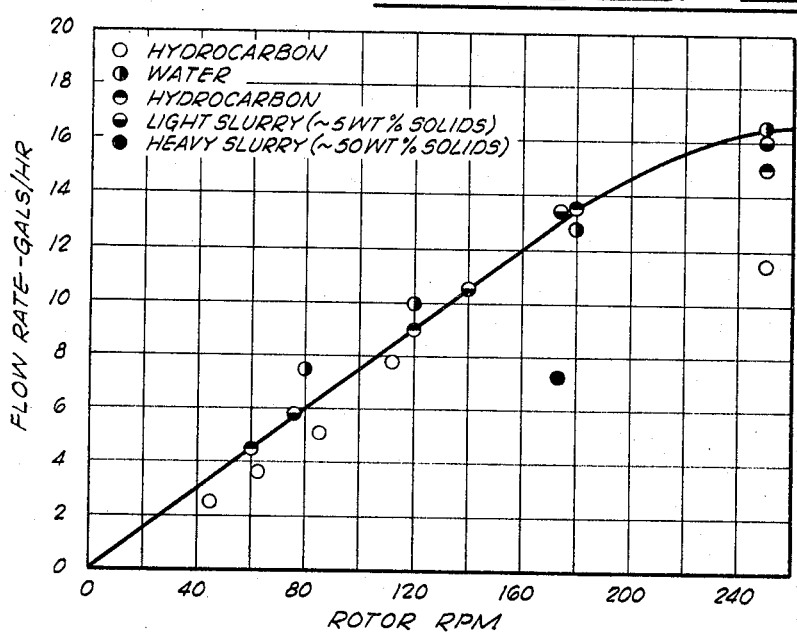
FIGURE 7 is a graph illustrating results obtained with the system schematically illustrated in FIGURE 6.

In the tests using the colored water, little leakage or bypass of the two fluids past the Teflon balls occurred. The capacity of the engine 129 for rotor speeds between 45 and 250 r.p.m. is shown in FIGURE 7 for the water system, and also employing two different types of hydrocarbons. The pressure exchange engine was also used in the system depicted in FIGURE 6 for transferring pressure energy between slurries. In one series of runs, a slurry of 5 weight percent solid ice particles in hydrocarbon was introduced to the engine at low pressures from slurry feed tank 138. In another series, the concentration of ice in the slurry was increased to 50 weight percent. The latter slurry could be pumped by the engine using a pressure differential across the Teflon balls of 6 p.s.i. The pumping capacities of the engine at various rates of rotation when pumping the slurries is shown in FIGURE 7.

Use of the pressure exchange engine of the present invention (in the type in which rolling balls are used) indicates that almost regardless of the size or capacity of the engine, it will operate effectively in the pressure transfer process with a mere 4 to 6 p.s.i. pressure differential established across the balls. The pressure transfer is therefore effected with a very high efficiency at relatively low pressure levels. For example, at a high pressure fluid pressure of 250 p.s.i., the transfer of the pressure engery to the low pressure fluid is effected with an efficiency exceeding 95%. The power requirement for operating the engine to accomplish such energy transfer is only a fraction of the power requirement of conventional pump and hydraulic turbine systems.

One of the most useful applications of the pressure energy exchange engine of the present invention is in recovering a maximum amount of the energy input to the pressurization step of an exchange crystallization desalination process as hereinbefore described. In this process, advantage is taken of the relatively rare property of water of undergoing a freezing point depression upon the application of pressure thereto. As a result of this phenomena, a process for removing salt from aqueous saline solutions can be developed in which the saline aqueous solution is initially mixed with a water immiscible substance which has the more universal characteristic of increasing in freezing point as the pressure applied to the substance is increased. In most instances, this latter material will be some type of hydrocarbon, and will be initially mixed in the form of a solid-liquid slurry with the incoming sea water or other saline aqueous solution.

While in such admixture, the particles of solid hydrocarbon are melted, and in absorbing latent heat of fusion, extract enough heat from the saline solution to freeze ice particles therefrom. There is thus formed a slurry of ice and liquid hydrocarbon. The next steps in the exchange crystallization process involve the separation of brine or concentrated saline solution from the ice-hydrocarbon slurry, followed by pressurization of the ice-hydrocarbon slurry to a relatively high pressure. The application of pressure to the ice-hydrocarbon slurry effectively melts the ice by depression of the freezing point, and reconverts a portion of the hydrocarbon to solid particles as a result of raising of the freezing point of the hydrocarbon. Of course, in the formation of the solid hydrocarbon particles, the heat of fusion is extracted from the hydrocarbon and is effective in melting the ice particles. The fresh water is then separated from the regenerated hydrocarbon slurry.

In order that the exchange crystallization process can be most economically practiced, following phase separation of the fresh water resulting from the regenerated hydrocarbon slurry, the separated hydrocarbon slurry and the fresh water produced by such separation which are still under substantial pressure are redirected through suitable turbines or other devices for recovering from these pressurized products of the process, as such of the energy of pressurization as possible.

From this general description of the exchange crystallization technique for removing salt from saline aqueous solutions, it will be perceived that the present invention may be usefully employed for the purpose of recovering a very high percentage of the energy of pressurization from the product fresh water and hydrocarbon slurry resulting from the last exchange crystallization step employed in the process. The manner in which the pressure energy exchange engines of the invention can be used in such an exchange crystallization desalination process is depicted schematically in FIGURE 8. As shown in FIGURE 8, an ice-hydrocarbon slurry, which has been generated at an upstream point in the desalination process by concurrently melting solid particles of the hydrocarbon, while freezing ice particles from the saline aqueous solution, is shown moving in a stream designated by reference numbheral 150. Let it be assumed that substantially all of the brine or other concentrated saline solution has been removed from the process stream prior to the arrival at the location depicted as stream 150 in FIGURE 8 of the ice-hydrocarbon slurry. The slurry stream 150 is split or divided into two streams 152 and 154 which are directed to a pair of pressure energy exchange engines 156 and 158 constructed in accordance with the present invention.

At the time of their introduction to the pressure energy exchange engines 156 and 158, the slurry streams 152 and is discharged at a relatively high pressure from the are at least substantially lower in pressure than the ultimate, relatively high pressure which is required to reconvert the ice to water, and to regenerate solid hydrocarbon particles in the liquid hydrocarbon. As the slurry of ice and liquid hydrocarbon is passed through the pressure energy exchange engines 156 and 158, it is pressured and is discharged at a relatively high pressure from the engines in the streams 160 and 162. These streams are merged and then conveyed in stream 164 to a high pressure pump 166. The function of the high pressure pump 166 is to impart to the ice-hydrocarbon slurry stream 164 the residual pressure required to overcome the pressure losses in the high pressure system and to supply the pressure increment required for operating the energy exchange engines. From the high pressure pump 166, the now highly pressurized mixture is directed via a suitable conduit or pipe line 168 into a separator 170. In the separator 170, the fresh water resulting from the melting of the ice and the hydrocarbon slurry resulting from the formation of solid particles of hydrocarbon, are separated by gravity or by other suitable means.

The fresh water from the separator 170, still under the final high pressure imparted to the mixture by the high pressure pump 166, is directed through a conduit or pipe line 172 to the high pressure side of the pressure energy exchange engine 158. Here the fresh water transfers its energy of pressurization to the incoming ice-hydrocarbon slurry which moves through the engine 158 from the flow line 154 to the flow line 162. After transferring tis energy of pressurization to the ice-hydrocarbon slurry, fresh water is discharged at substantially atmospheric pressure from the engine 158 through a conduit or pipe line 174 to a suitable storage facility.

It should be here pointed out that a pressurization by the high pressure pump 166 effects the melting of the ice particles and the freezing of the hydrocarbon into solid particles, the mixture undergoes a significant reduction in volume. It is thus necessary to add some high pressure fresh water via the conduit 175 to make up for the volume reduction in the system.

The hydrocarbon slurry which is separated from the fresh water in the separator 170 is directed through a pipe lines or conduit 176 to the high pressure side of the pressure energy exchange engine 156. Here the hydrocarbon slurry transfers its energy of pressurization to the ice-hydrocarbon slurry which is charged to the low pressure side of the pressure energy exchange engine 156. The hydrocarbon slurry then leaves the engine 156 at substantially atmospheric pressure via the line or conduit 178. In general, this hydrocarbon slurry will be recycled to the first step of the exchange crystallization process in which it is mixed with incoming cold saline water, and the solid particles of hydrocarbon in the slurry are melted to freeze ice particles from the incoming saline solution.

When the pressure energy exchange engine of the invention is used in the exchange crystallization desalination process in the manner described, the seal plates, or other stationary structure which is located in juxtaposition to the end faces of the rotor, are preferably spaced from these end faces, and the seal plates, or even the entire stationary structure, are maintained by a suitable temperature control means at a temperature slightly below the freezing point of water and/or the hydrocarbon or other exchange liquid used. The interior of the rotor, however, should be retained at about the temperature of the slurries which are passed therethrough. With this arrangement, a slight amount of initial leakage of water and hydrocarbon between the end faces of the rotor and the adjacent seal plates or other stationary structure will occur. This leakage is, of course, aided by the radially acting centrifugal force developed by the rotor during its rotation, and in this sense, the rotor, seal plates and housing constitute means for continuously supplying a liquid (hydrocarbon and/or water) or the space between the seal plates and the rotor. The leaking material will, however, be frozen to form a seal between these adjacent materials, and the solid thus produced will form a frozen disc of high lubricity. An excellent seal and bearing structure is thus simultaneously and automatically established at essentially no expense. The same principle of seal-bearing establishment can, of course, also be used in the case of other process materials than those which are encountered in the exchange crystallization process of desalination of saline aqueous solutions. It should also be pointed out that the lubrication and sealing functions can frequently be obtained by merely permitting controlled leakage of the pumped materials to occur without freezing this material.

From the foregoing description of the invention, it will have become apparent that the pressure energy exchange engine of the invention provides a device which is highly useful and efficient for recovery of pressure energy from a fluid. The device can be economically manufactured and maintained, and requires a relatively small power input in its operation.

Although certain preferred embodiments have been described in the foregoing specification and illustrated in the drawings, many modifications of structure can be effected in these embodiments without departure from the basic principles which account for the achievement of the objects of the invention. All such modifications which do not involve such departure are therefore deemed to be circumscribed by the spirit and scope of the invention except as the same may be necessarily limited by the appended claims or reasonable equivalents thereof.

What is claimed is:

1. An engine for exchange of energy from a pressurized fluid to a fluid of relatively lower pressure comprising:
    a rotatably mounted solid cylindrical rotor having a pair of spaced, substantially parallel planar end faces, and having at least one bore extending axially therethrough with each of said bores having an opening at each end thereof with said openings located in said planar end faces and all spaced from each other;
    a freely displaceable separatory member positioned in each of the bores of the movable member and movable therealong to divide each bore into a pair of chambers separated by said separatory member;
    a pair of sealing plates disposed adjacent and parallel to the end faces of said cylindrical rotor, and slidingly and sealingly engaging said end faces, and each having at least one fluid inlet passageway and one fluid discharge passageway in each sealing plate, said passageways being positioned so that a fluid inlet passageway in one of the sealing plates is aligned with each bore in the cylindrical rotor at such time during the rotation of said rotor as a fluid discharge passageway in the other of the sealing plates is aligned with the same bore, said fluid inlet passageways and fluid discharge passageways being constantly isolated from each other during operation of the engine, and the bore openings and passageway openings being positioned in their respective surfaces so that during movement of said rotor, the openings at the end of each bore are, in alternating sequence, brought at one time into concurrent registry with an inlet passageway opening at one end of the respective bore and a discharge passageway opening at the other end of the respective bore, and then, at a different time, into concurrent registry with a discharge passageway opening at said one end of the respective bore and an inlet passageway at said other end of the respective bore; and means for cyclically moving said rotor relative to said sealing plates so that each of said bore openings periodically moves through the same path to repeatedly effect said alternating sequence of registration.

2. An engine for exchange of energy from a pressurized fluid to a fluid of relatively lower pressure comprising:

a movable member having at least one bore therein with each of said bores having an opening at each end thereof with said openings located in a surface of the movable member and with said openings all spaced from each other;

a freely displaceable separatory member positioned in each of the bores of the movable member and movable therealong to divide each bore into a pair of chambers separated by said separatory member;

a stationary structure having at least one sealing surface slidingly and sealingly engaging all surfaces of said movable member in which the openings of said bores are located, and said stationary structure further having at least one pair of spaced fluid inlet passageways extending therethrough and each opening at a sealing surface, and a pair of spaced fluid discharge passageways extending therethrough and spaced from said fluid inlet passageways, said fluid discharge passageways also each opening at a sealing surface, the bore openings and passageway openings being positioned in their respective surfaces so that during movement of said movable member, the openings at the end of each bore are, in alternating sequence, brought at one time into concurrent registry with an inlet passageway opening at one end of the respective bore and a discharge passageway opening at the other end of the respective bore, and then, at a different time, into concurrent registry with a discharge passageway at said one said end of the respective bore and an inlet passageway at said other end of the respective bore;

means for cyclically moving said movable member relative to said stationary structure so that each of said bore openings periodically moves through the same path to repeatedly effect said alternating sequence of registration;

sealing and lubricating material positioned between said movable member and said stationary structure, wherein said sealing and lubricating material is ice.

3. An energy exchange engine as defined in claim 1 and further characterized to include:

a housing around said cylindical rotor; and a pair of closure plates secured to said housing and retaining said sealing plates in juxtaposition to the end faces of the cylindrical rotor.

4. A pressure exchange apparatus comprising:

a hollow cylindrical housing open at opposite ends;

first and second closure plates secured to said housing at the opposite ends thereof and extending across the openings at the opposite ends of the housing;

said first closure plate having a journal recess in the center thereof communicating with the hollow interior of the cylindrical housing and having at least one pair of space, fluid passageways extending therethrough and communicating with the hollow interior of the cylindrical housing, said fluid passageways being located substantially equal radial distances from said journal recess; and said second closure plate having a drive shaft bore extending through the center thereof, and having at least one pair of spaced, fluid passageways extending therethrough and communicating with the hollow interior of the cylindrical housing and in alignment with the fluid passageways through said first closure plate, said fluid passageways through the second closure plate being located substantially equal radial distances from said drive shaft bore;

a cylindrical rotor positioned concentrically within said cylindrical housing and having a substantially planar end face at each end thereof with each of said end faces facing and spaced from one of said closure plates, said rotor having at least one bore extending axially therethrough and opening in the opposite end faces of the rotor, each axially extending bore being positioned in the rotor for periodic simultaneous alignment, and communication, with fluid passageways in each of the closure plates when said rotor is rotated about its longitudinal axis;

a drive shaft secured to one of the end faces of said rotor at the center thereof and extending through the drive shaft bore in said second closure plate;

a supporting projection secured to said rotor at the center of the second end face thereof and projecting into said journal recess;

sealing means positioned between each of the closure plates and the adjacent end faces of the rotor for preventing loss of fluid from each axially extending bore of the rotor through the space between the end faces of the rotor and the respective closure plates when each bore is out of alignment with the fluid passageways through the closure plates, said sealing means being partially solid and partially liquid; and means for continuously supplying liquid to said sealing means to replace any of said sealing means liquid lost from between said closure plates and the adjacent end faces of said rotor.

5. A pressure exchange apparatus as defined in claim 4 wherein said sealing means comprises a sealing plate positioned between each end face of the rotor and the adjacent closure plate, said sealing plates each having tubular projections projecting into each fluid passageway in the adjacent closure plate, and each having passageways extending through each tubular projection and through the respective sealing plate for placing the fluid passageways in communication through the sealing plates with the bores in the rotor periodically during the rotation of the rotor relative to the sealing plates and closure plates.

6. A pressure exchange apparatus as defined in claim 5 and further characterized to include resilient means in each of the fluid passageways in the closure plates and bearing against the respective tubular projections in the respective fluid passageways for biasing the respective sealing plates toward the adjacent end face of the rotor.

7. A pressure exchange apparatus as defined in claim 6 wherein the partially liquid and partially solid portions of said sealing means includes a single chemically uniform material which is a low coefficient of friction bearing material positioned between each of the sealing plates and the adjacent end face of the rotor.

8. A pressure exchange apparatus as defined in claim 7 wherein said bearing material is ice.

9. A pressure exchange apparatus as defined in claim 4 and further characterized to include means for freezing a portion of said continuously supplied liquid to form the solid part of said sealing means.

10. A pressure exchange apparatus as defined in claim 7 wherein said low coefficient of friction bearing material is a frozen hydrocarbon.

11. In a water purification system of the type which includes first means for simultaneously melting solid particles of a first material while freezing ice particles from an impure aqueous solution mixed with said first material, and second means for applying pressure to the ice crystals and liquid first material produced by said first means to reconvert the ice to water, and the first material at least partially to solid particles, the improvement to said system which comprises:
- a rotor mounted for rotation about an axis extending therethrough and having at least one external surface which occupies the same locus at all times during the rotation of the rotor;
- at least one bore extending from at least one of said external surfaces into the rotor and having spaced openings at opposite ends of the bore in at least one of the external surfaces;
- at least one stationary high pressure passageway means positioned adjacent said rotor and positioned for aligning a first fluid passageway with one of the openings to each bore in said rotor at a time during the rotation of the rotor;
- at least one stationary low pressure fluid passageway means positioned adjacent said rotor and positioned for aligning a second fluid passageway with the other of the openings to each bore in said rotor at a time during the rotation of said rotor which is different from said first mentioned time;
- at least one stationary fluid discharge passageway means positioned adjacent said rotor and positioned for aligning a third fluid passageway with said one of the openings to each of said bores in the rotor at the same time during the rotation of said rotor when said first passageways are aligned therewith;
- at least one other stationary fluid discharge passageway means positioned adjacent said rotor and positioned for aligning a fourth fluid passageway with said other of the openings to each of said bores in the rotor at the same time during the rotation of said rotor when said second fluid passageways are aligned therewith;
- a stationary sealing structure for closing each bore in the rotor at each end thereof as each bore moves out of alignment with said fluid passageways during rotation of the rotor, said stationary sealing structure having all its parts retained in a fixed and constant position relative to all of said stationary fluid passageway means;
- first conduit means for connecting said first melting and freezing means to each of said stationary low pressure fluid passageway means to convey an ice crystal-liquid slurry from said first melting and freezing means to said first fluid passageways;
- second conduit means for connecting said second melting and freezing means to each of said stationary high pressure fluid passageway means to convey water and solid particles of said first material from said second melting and freezing means to said second fluid passageways; and
- means for transferring a slurry from said third fluid passageways to said second melting and freezing means.

12. An engine for exchange of energy from a pressurized fluid to a fluid of relatively lower pressure comprising:
- a movable member having at least one bore therein with each of said bores having an opening at each end thereof with said openings located in a surface of the movable member and with said openings all spaced from each other;
- a freely displaceable separatory member positioned in each of the bores of the movable member and movable therealong to divide each bore into a pair of chambers separated by said separatory member;
- a stationary structure having at least one sealing surface slidingly and sealingly engaging all surfaces of said movable member in which the openings of said bores are located, and said stationary structure further having at least one pair of spaced fluid inlet passageways extending therethrough and each opening at a sealing surface, and a pair of spaced fluid discharge passageways extending therethrough and spaced from said fluid inlet passageways, said fluid discharge passageways also each opening at a sealing surface, the bore openings and passageway openings being positioned in their respective surfaces so that during movement of said movable member, the openings at the end of each bore are, in alternating sequence, brought at one time into concurrent registry with an inlet passageway opening at one end of the respective bore and a discharge passageway opening at the other end of the respective bore, and then, at a different time, into concurrent registry with a discharge passageway at said one end of the respective bore and an inlet passageway at said other end of the respective bore;
- means for cyclically moving said movable member relative to said stationary structure so that each of said bore openings periodically moves through the same path to repeatedly effect said alternating sequence of registration; and
- sealing and lubricating material positioned between said movable member and said stationary structure, said sealing and lubricating material being a frozen hydrocarbon.

13. In a water purification system of the type which includes means for freezing ice crystals from an impure aqueous solution and means for applying pressure to a mixture of said ice crystals and a hydrocarbon to form solid particles of hydrocarbon and simultaneously melt the ice crystals to form water, the improvement which comprises:
- a rotor mounted for rotation about an axis extending therethrough and having at least one external surface which occupies the same locus at all times during the rotation of the rotor;
- at least one bore extending from at least one of the external surface into the rotor and having spaced openings at opposite ends of the bore in at least one of the external surfaces;
- at least one stationary high pressure passageway means positioned adjacent said rotor and positioned for aligning a first fluid passageway with one of the openings in each bore in said rotor at a time during the rotation of the rotor;
- at least one stationary low pressure fluid passageway means positioned adjacent said rotor and positioned for aligning a second fluid passageway with the other of the openings to each bore in said rotor at a time during the rotation of said rotor which is different from said first mentioned time;
- at least one stationary fluid discharge passageway means positioned adjacent said rotor and positioned for aligning a third fluid passageway with said one of the openings in each of said bores in the rotor at the time during the rotation of said rotor when said first passageways are aligned therewith;
- at least one other stationary fluid discharge passageway means positioned adjacent said rotor and positioned for aligning a fourth fluid passageway with said other of the openings to each of said bores in the rotor at the time during the rotation of said rotor when said second fluid passageways are aligned therewith;
- a stationary sealing structure for closing each bore in the rotor at each end thereof as each bore moves out of alignment with said fluid passageways during rotation of the rotor, said stationary sealing structure having all its parts retained in a fixed and constant position relative to all of said stationary fluid passageway means;
- first conduit means for connecting a source of said ice crystals and hydrocarbon to each of said stationary low pressure fluid passageway means to convey an ice crystal-hydrocarbon liquid slurry to said first fluid passageways;
- second conduit means for connecting said pressure applying means to each of said stationary high pressure passageway means to convey water and solid particles of said hydrocarbon from said pressure applying means to said second fluid passageways; and means for transferring a slurry from said third fluid passageways to said second melting and freezing means.

14. In exchange crystallization systems of the type which include means for applying pressure to crystals of one material in admixture with a liquid second material to convert the crystals of the first material to liquid while converting a portion of the liquid of said second material to crystals and thereby to form a pumpable slurry, the improvement to said systems which comprises:

a rotor mounted for rotation about an axis extending therethrough and having at least one external surface which occupies the same locus at all times during the rotation of the rotor;

at least one bore extending from at least one of said external surfaces into the rotor and having spaced openings at opposite ends of the bore in at least one of the external surfaces;

at least one stationary high pressure passageway means positioned adjacent said rotor and positioned for aligning a first fluid passageway with one of the openings to each bore in said rotor at a time during the rotation of the rotor;

at least one stationary low pressure fluid passageway means positioned adjacent said rotor and positioned for aligning a second fluid passageway with the other of the openings to each bore in said rotor at a time during the rotation of said rotor which is different from said first mentioned time;

at least one stationary fluid discharge passageway means positioned adjacent said rotor and positioned for aligning a third fluid passageway with said one of the openings to each of said bores in the rotor at the same time during the rotation of said rotor when said first passageways are aligned therewith;

at least one other stationary fluid discharge passageway means positioned adjacent said rotor and positioned for aligning a fourth fluid passageway with said other of the openings to each of said bores in the rotor at the same time during the rotation of said rotor when said second fluid passageways are aligned therewith;

a stationary sealing structure for closing each bore in the rotor at each end thereof as each bore moves out of alignment with said fluid passageways during rotation of the rotor, said stationary sealing structure having all its parts retained in a fixed and constant position relative to all of said stationary fluid passageway means;

first conduit means for connecting a source of a slurry of said first material in liquid form with liquid and solid portions of said second material to each of said stationary low pressure fluid passageway means to convey said slurry to said first fluid passageways;

second conduit means for connecting said pressure applying means to each of said stationary high pressure fluid passageway means to convey a slurry of liquid first material and solid particles of said second material from said pressure applying means to said second fluid passageways; and means for transferring a slurry from said third fluid passageways to said pressure applying means.

References Cited

UNITED STATES PATENTS

| | | | |
|---|---|---|---|
| 2,836,346 | 5/1958 | Jendrassik | 230—69 |
| 2,698,582 | 1/1955 | Vincent | 103—52 |
| 2,876,704 | 3/1959 | Collion et al. | 103—49 |
| 3,085,512 | 4/1963 | Alyanak et al. | 103—49 |
| 3,159,474 | 1/1964 | Moloney | 62—123 X |
| 3,175,499 | 3/1965 | Varney et al. | 103—49 |
| 3,262,395 | 7/1966 | Morando | 103—49 |

ROBERT A. O'LEARY, *Primary Examiner.*

W. E. WAYNER, *Assistant Examiner.*

U.S. Cl. X.R.

103—52; 230—54